(12) United States Patent
Miyazaki et al.

(10) Patent No.: US 9,337,479 B2
(45) Date of Patent: May 10, 2016

(54) NONAQUEOUS ELECTROLYTE SECONDARY BATTERY

(75) Inventors: Shinya Miyazaki, Moriguchi (JP); Hironori Shirakata, Moriguchi (JP)

(73) Assignee: SANYO Electric Co., Ltd., Daito-shi, Osaka (JP)

( * ) Notice: Subject to any disclaimer, the term of this patent is extended or adjusted under 35 U.S.C. 154(b) by 419 days.

(21) Appl. No.: 13/992,521

(22) PCT Filed: Dec. 9, 2011

(86) PCT No.: PCT/JP2011/078556
§ 371 (c)(1),
(2), (4) Date: Jun. 7, 2013

(87) PCT Pub. No.: WO2012/081518
PCT Pub. Date: Jun. 21, 2012

(65) Prior Publication Data
US 2013/0260262 A1    Oct. 3, 2013

(30) Foreign Application Priority Data
Dec. 15, 2010    (JP) ................. 2010-279840

(51) Int. Cl.
*H01M 4/36* (2006.01)
*H01M 4/505* (2010.01)
*H01M 4/485* (2010.01)
*H01M 4/525* (2010.01)
*H01M 10/0525* (2010.01)
*H01M 10/0569* (2010.01)
*H01M 4/131* (2010.01)

(52) U.S. Cl.
CPC .............. *H01M 4/364* (2013.01); *H01M 4/131* (2013.01); *H01M 4/485* (2013.01); *H01M 4/505* (2013.01); *H01M 4/525* (2013.01); *H01M 10/0525* (2013.01); *H01M 10/0569* (2013.01); *Y02E 60/122* (2013.01); *Y02T 10/7011* (2013.01)

(58) Field of Classification Search
CPC ..... H01M 4/364; H01M 4/131; H01M 4/525; H01M 4/505; H01M 10/0525; H01M 10/0569; H01M 4/485; Y02E 60/122
See application file for complete search history.

(56) References Cited

U.S. PATENT DOCUMENTS

2003/0073002 A1    4/2003    Imachi et al.
2005/0266313 A1    12/2005    Kitao et al.

FOREIGN PATENT DOCUMENTS

| JP | 2002-358962 A | | 12/2002 |
|---|---|---|---|
| JP | 2003-168430 A | | 6/2003 |
| JP | 2004-146363 A | | 5/2004 |
| JP | 2005-267956 A | | 9/2005 |
| JP | 2005-285720 A | | 10/2005 |
| JP | 2005-340055 A | | 12/2005 |
| JP | 2006-278322 | * | 10/2006 |
| JP | 2006-278322 A | | 10/2006 |
| JP | 2009-004310 A | | 1/2009 |

OTHER PUBLICATIONS

International Search Report for PCT/JP2011/078556, mailing date of Aug. 7, 2012; With English translation.

* cited by examiner

*Primary Examiner* — Laura Weiner
(74) *Attorney, Agent, or Firm* — Westerman, Hattori, Daniels & Adrian, LLP

(57) ABSTRACT

[Problem] To provide a nonaqueous electrolyte secondary battery exhibiting superior stability characteristics and having charge/discharge characteristics exhibiting a high-rate discharge stroke, even when a lithium-nickel-cobalt manganate and a spinel-type lithium manganate are used as the positive electrode active material. [Solution] A mixture having a specific ratio of a tungsten- and zirconium-modified lithium-nickel-cobalt manganate and a spinel-type lithium manganate is used as the positive electrode active material. Furthermore, a nonaqueous electrolyte having a specific ratio of the content of dimethyl carbonate and the content of a cyclic carbonate is used.

4 Claims, No Drawings

NONAQUEOUS ELECTROLYTE SECONDARY BATTERY

TECHNICAL FIELD

The present invention relates to a nonaqueous electrolyte secondary battery and relates to a high-capacity nonaqueous electrolyte secondary battery that is particularly favorable in safety and excellent in high-load (high-rate) charge-discharge cycle performance.

BACKGROUND ART

As a power supply for driving modern mobile electronic instruments such as a mobile phone, mobile personal computer, or mobile music player and further as a power supply for electric tools, hybrid electric vehicles (HEVs), or electric vehicles (EV5), a nonaqueous electrolyte secondary battery represented by a lithium-ion secondary battery having high energy density and with high capacity is extensively utilized for low-load and high-load applications.

As a positive electrode active material of these nonaqueous electrolyte secondary batteries, lithium transition metal complex oxides represented by $LiMO_2$ (where M is at least one of Co, Ni, and Mn) capable of reversibly absorbing and desorbing lithium ions, i.e., a single one of or a mixture of a plurality of $LiCoO_2$, $LiNiO_2$, $LiNi_yCo_{1-y}O_2$ (y equals 0.01 to 0.99), $LiMnO_2$, $LiCo_xMn_yNi_zO_2$ (x+y+z=1), $LiMn_2O_4$, $LiFePO_4$, or the like is used. Of these, lithium-cobalt complex oxides or lithium-cobalt complex oxide added with a dissimilar metal element is frequently used due to superiority over others in various battery characteristics.

However, since cobalt is expensive and the existing amount as a resource is small, many attempts have been made until now to achieve various battery characteristics comparable or superior to a case where cobalt is used by using other transition metals instead of cobalt. Of these, lithium-containing nickel oxide active material is expected to be a promising material in that the theoretical capacity is large and the charge-discharge potential is high, and so is lithium-containing manganese oxide active material in that the cost is low and the thermal stability is excellent. However, lithium-containing nickel oxide active material has a problem that the thermal stability is low, and lithium-containing manganese oxide active material has a problem in that the theoretical capacity is small and the cycle life at high temperature is short.

Although mixing spinel lithium manganese oxide with nickel oxide active material tends to improve safety performance, the addition of lithium manganese oxide in large amounts reduces the capacity and causes a decrease in high-temperature storage and high-rate charge-discharge cycle performance. As described above, it has been difficult with conventional methods to realize both an improvement in safety performance as well as in favorable (high-load) cycle performance and an increase in capacity.

For the problem described above with each of these lithium-containing nickel oxide active material and lithium-containing manganese oxide active material, Patent Document 1, for example, discloses a technique in which improvements in thermal stability and discharge capacity are both realized by mixing, as a positive electrode material, fluorine-added lithium-nickel-cobalt-manganese complex oxide represented by $LiNi_{1-x-y}Co_xMn_yO_2$ (x and y satisfy the condition of $0.5 < x+y < 1.0$ and $0.1 < y < 0.6$ in the formula) and lithium-manganese complex oxide having a spinel structure represented by $Li_{(1+a)}Mn_{2-a-b}M_bO_4$ (M is at least one element selected from the group consisting of Al, Co, Ni, Mg, and Fe, and conditions of $0 \le a \le 0.2$ and $0 \le b \le 0.1$ are satisfied in the formula).

Patent Document 2 discloses that, in a nonaqueous electrolyte secondary battery in which a coating is formed on the surface of a carbon material as a negative active material by causing a particular cyclic carbonate ester to be contained within a nonaqueous electrolyte so as to improve the charge-discharge cycling characteristics, a nonaqueous electrolyte secondary battery with improved output characteristics and charge-discharge cycle life can be obtained by combining lithium-manganese complex oxide and lithium-nickel-cobalt-manganese complex oxide as a positive electrode active material, the lithium-manganese complex oxide represented by composition formula $Li_xMn_{2-y1}M1_{y2}O_{4+z}$ (M1 is at least one element selected from the group consisting of Al, Co, Ni, Mg, and Fe, and conditions of $0 \le x \le 1.5$, $0 \le y1 \le 1.0$, $0 \le y2 \le 0.5$, and $-0.2 \le z \le 0.2$ are satisfied in the formula) having a spinel structure, and the lithium-nickel-cobalt-manganese complex oxide represented by composition formula $Li_aNi_bCo_cMn_dO_2$ (where conditions of $0 \le a \le 1.2$ and b+c+d=1 are satisfied).

Patent Document 1: JP-A-2005-267956
Patent Document 2: JP-A-2004-146363
Patent Document 3: JP-A-2006-278322

DISCLOSURE OF INVENTION

Problem to be Solved by the Invention

However, as disclosed in Patent Documents 1 and 2, studies particularly for realizing both an increase in capacity and safety are insufficient for nonaqueous electrolyte secondary batteries in which lithium-nickel-cobalt-manganese complex oxide and lithium-manganese complex oxide having a spinel structure are mixed and used as a positive electrode active material of the nonaqueous electrolyte secondary battery, and various conditions required for applications for a power supply for driving recent mobile electronic instruments or the like have not been sufficiently satisfied.

The inventors of the present invention have conducted intensive researches based on the understanding described above and have found that a nonaqueous electrolyte secondary battery that is excellent in high-rate charge-discharge cycle performance and safety can be obtained by using a mixture of lithium nickel-cobalt-manganese oxide modified by tungsten and zirconium and spinel lithium manganese oxide in a particular proportion as a positive electrode active material and using a nonaqueous electrolyte in which the content of dimethyl carbonate and cyclic carbonate is in a particular proportion. Thus, the present invention has been completed.

That is, it is an object of the present invention to provide a nonaqueous electrolyte secondary battery that is excellent in safety performance and excellent in high-rate charge-discharge cycle performance, even in the case where lithium nickel-cobalt-manganese oxide and spinel lithium manganese oxide are used as a positive electrode active material.

Note that Patent Document 3 discloses an invention of a nonaqueous electrolyte secondary battery including a positive electrode including a positive electrode mixture layer containing, as an active material, layered lithium-manganese-nickel-cobalt complex oxide represented by composition formula $Li_{(1+\delta)}Mn_xNi_yCo_{(1-x-y-z)}M_zO_2$ (M is at least one element selected from the group consisting of Ti, Zr, Nb, Mo, W, Al, Si, Ga, Ge, and Sn, $-0.15 < \delta < 0.15$, $0.1 < x \le 0.5$, $0.6 < x+y+z \le 1.0$, and $0 \le z \le 0.1$) and spinel lithium-manganese complex oxide represented by composition formula $Li_{(1+\eta)}Mn_{(2-w)}$ $M'_wO_4$ (M' is at least one element selected from the group consisting of Mg, Ca, Sr, Al, Ga, Zn, and Cu, $0 \leq \eta \leq 0.2$, and $0 \leq w \leq 0.1$), such that the percentage of the spinel lithium-manganese complex oxide with respect to the total of the layer lithium-manganese-nickel-cobalt complex oxide and the spinel lithium-manganese complex oxide is 20 to 60% by mass in the positive electrode mixture layer, and the density of the positive electrode mixture layer is 3.0 to 3.6 g/cm$^3$. However, a case where tungsten or zirconium is used specifically as the element M included in $Li_{(1+\delta)}Mn_xNi_yCo_{(1-x-y-z)}M_zO_2$ has not been studied.

Means for Solving the Problem

To achieve the object described above, a nonaqueous electrolyte secondary battery of the present invention is a nonaqueous electrolyte secondary battery that includes a positive electrode plate including a positive electrode active material capable of absorbing and desorbing a lithium ion, a negative electrode plate including a negative electrode active material capable of absorbing and desorbing a lithium ion, and a nonaqueous electrolyte including a nonaqueous solvent and a solute. The positive electrode active material contains lithium nickel-cobalt-manganese oxide represented by Lia(NibCocMnd)(1−x−y)WxZryO2 (where $0.9 \leq a \leq 1.2$, $0.3 \leq b \leq 0.6$, $0.1 \leq c \leq 0.7$, $0 \leq d \leq 0.4$, $b+c+d=1$, $0.001 \leq x \leq 0.05$, and $0.001 \leq y \leq 0.05$) and spinel lithium manganese oxide represented by LieMn2-fM1fO4 (where M1 is at least one element selected from B, Mg, Ca, Sr, Ba, Ti, Ni, Al, Nb, Mo, W, Y, and Rh, $0.9 \leq x \leq 1.20$. $9 \leq e \leq 1.2$, and $0 \leq f \leq 0.1$) in a proportion of 90:10 to 60:40 (mass ratio). The nonaqueous electrolyte includes cyclic carbonate and chain carbonate as the nonaqueous solvent, a content proportion of the cyclic carbonate is 10% by mass or greater and 40% by mass or less of the nonaqueous electrolyte, and a content proportion of dimethyl carbonate included in the chain carbonate is 25% by mass or greater.

With the nonaqueous electrolyte secondary battery according to the present invention, a nonaqueous electrolyte secondary battery can be obtained that ensures safety regardless of lithium nickel-cobalt-manganese oxide being contained and that suppresses a decrease in high-rate charge-discharge cycle performance sufficiently regardless of lithium manganese oxide being contained.

This is presumably because, by using a mixture of lithium nickel-cobalt-manganese oxide (positive electrode active material a) modified by tungsten and zirconium and spinel lithium manganese oxide (positive electrode active material b) in a predetermined proportion as the positive electrode active material and using the nonaqueous electrolyte in which the content of dimethyl carbonate and cyclic carbonate is in a predetermined proportion within the nonaqueous electrolyte, (1) the deteriorative reaction of the positive electrode caused by the elution of manganese, for example, is suppressed, which contributes to the improvement of the high-rate charge-discharge cycling characteristics, and
(2) the drastic structural collapse is suppressed because of the presence of tungsten and zirconium incorporated into lithium nickel-cobalt-manganese oxide in addition to the thermal stability of lithium manganese oxide itself, which contributes to the improvement of safety.

Note that, in the nonaqueous electrolyte secondary battery according to the present invention, at least one element selected from Ti, Nb, Mo, Zn, Al, Sn, Mg, Ca, and Sr may be further incorporated as a dissimilar element M2 into the lithium nickel-cobalt-manganese oxide as the positive electrode active material a. In that case, the content proportion of M2 is preferably 0.1 mol % or greater and 5 mol % or less. With the addition of this M2, generation of smoke at the time of a short-circuit test of the nonaqueous electrolyte secondary battery can be suppressed, and safety can be improved further.

BEST MODE(S) FOR CARRYING OUT THE INVENTION

An embodiment for carrying out the invention of this application will be described below in detail using examples and comparative examples. Note that, each of the examples below shows one example of a nonaqueous electrolyte secondary battery for embodying the technical idea of the present invention and is not intended to limit the present invention to the examples. The present invention is equally applicable to those in which various modifications have been made without departing from the technical idea set forth in the appended claims.

Example 1

First, a specific manufacturing method of a nonaqueous electrolyte secondary battery of Example 1 will be described.
[Preparation of Positive Electrode Active Material a]
As a positive electrode active material a, tungsten- and zirconium-containing lithium nickel-cobalt-manganese oxide in which the abundance ratio of nickel, cobalt, and manganese was 0.3:0.4:0.3 (mole ratio), the content proportion of tungsten was 5 mol %, the content proportion of zirconium was 5 mol %, and the total of the contained molar amounts of nickel, cobalt, manganese, tungsten, and zirconium with respect to 1 mol of lithium was 1 mol, i.e., $Li(Ni_{0.3}Co_{0.4}Mn_{0.3})_{0.9}W_{0.05}Zr_{0.05}O_2$ (which equals $LiNi_{0.27}Co_{0.36}Mn_{0.27}W_{0.05}Zr_{0.05}O_2$), was used.

$LiNi_{0.27}CO_{0.36}Mn_{0.27}W_{0.05}Zr_{0.05}O_2$ as the positive electrode active material a was prepared in the following manner. That is, lithium carbonate ($Li_2CO_3$) was used as a source of lithium as a starting material, and nickel-cobalt-manganese complex oxide obtained by causing the thermal decomposition reaction of nickel-cobalt-manganese-complex carbonate generated in a coprecipitation by adding sodium hydrogen carbonate to nickel-cobalt-manganese sulfuric acid solution (0.3:0.4:0.3 (mole ratio) for nickel, cobalt, and manganese) was used as a source of nickel, cobalt, and manganese.

Next, lithium carbonate, nickel-cobalt-manganese complex oxide, tungsten oxide ($WO_3$), and zirconium oxide ($ZrO_2$) were mixed, such that there was 0.05 mol of each of tungsten and zirconium and the total of nickel, cobalt, manganese, tungsten, and zirconium was 1 mol with respect to 1 mol of lithium. That is, 0.9 mol of nickel-cobalt-manganese complex oxide described above, 0.05 mol of tungsten oxide, and 0.05 mol of zirconium oxide with respect to 1 mol of lithium carbonate were added in the proportion and mixed in a mortar.

Next, tungsten- and zirconium-containing lithium nickel-cobalt-manganese oxide in which the content proportion of Li, Ni, Co, Mn, W, and Zr was 1.0:0.27:0.36:0.27:0.05:0.05 (mole ratio) was obtained through firing of this mixture for 20 hours at 850° C. under air atmosphere. Note that the abundance ratio of nickel, cobalt, and manganese was determined by inductively coupled plasma (ICP) emission spectrometry.
[Preparation of Positive Electrode Active Material b]
As a positive electrode active material b, spinel lithium manganese oxide ($LiMn_2O_4$) obtained by mixing lithium carbonate ($Li_2CO_3$) and manganese oxide obtained by thermal decomposition of manganese carbonate and then firing the mixture for 20 hours at 750° C. under air atmosphere was used.

[Preparation of Positive Electrode Active Material]

The positive electrode active materials a and b obtained in the manner described above were each pulverized to an average particle diameter of 15 μm and then mixed such that the mixture proportion for the positive electrode active material a and positive electrode active material b was 80:20 (mass ratio) for a positive electrode active material used in Example 1.

[Preparation of Positive Electrode Plate]

Ninety-four parts by weight of the positive electrode active material obtained in the manner described above, 3 parts by weight of carbon powder as a conducting agent, and 3 parts by weight of polyvinylidene fluoride (PVdF) powder as a binding agent were mixed, and this was mixed with an N-methylpyrrolidone (NMP) solution to prepare a positive electrode mixture slurry. This slurry was applied by a doctor blade method to both surfaces of a positive electrode substrate formed of aluminum with a thickness of 20 μm. Then, through compression using a compression roller, a positive electrode plate used in Example 1 was prepared.

[Preparation of Negative Electrode Plate]

Ninety-seven point five parts by mass of graphite as a negative electrode active material, 1.0 part by mass of carboxymethyl cellulose (CMC) as a thickening agent, 1.5 parts by mass of styrene-butadiene rubber (SBR) as a binding agent, and an appropriate amount of water were mixed to prepare a negative electrode mixture slurry. This slurry was applied by a doctor blade method to both surfaces of a negative electrode substrate formed of copper with a thickness of 12 μm and then passed through a drier to be dried to form a negative electrode active material layer on both surfaces of the negative electrode plate. Next, through compression using a compression roller, a negative electrode plate used in each example and comparative example was obtained.

Note that the potential of graphite is about 0.1 V relative to Li as the reference. The amount of active material application of the positive electrode plate and the negative electrode plate was adjusted such that the charge capacity ratio (negative electrode charge capacity by positive electrode charge capacity) of the positive electrode plate and the negative electrode plate is 1.1 at the potential of the positive electrode active material that is the design reference.

[Preparation of Nonaqueous Electrolyte]

Lithium hexafluorophosphate ($LiPF_6$) as a solute was dissolved in a mixed solvent of ethylene carbonate (EC), dimethyl carbonate (DMC), methyl ethyl carbonate (MEC), and vinylene carbonate (VC) to prepare a nonaqueous electrolyte. In Example 1, the mixture proportion of the solvent and solute was 20:48:12:2:18 (mass ratio) for EC, DMC, MEC, VC, and LiPF6. Note that VC is a general graphite negative electrode protection performance improvement additive agent, and the presence or absence of the addition does not substantially influence the effect of the present invention.

[Preparation of Battery]

The positive electrode plate and negative electrode plate obtained in the manner described above were wound with a separator formed of a microporous membrane made from polypropylene interposed therebetween to prepare a wound electrode assembly, and the wound electrode assembly and the nonaqueous electrolyte described above were sealed within a cylindrical outer can of a battery to prepare a cylindrical nonaqueous electrolyte secondary battery in Example 1. Note that the size of the obtained cylindrical nonaqueous electrolyte secondary battery was 65 mm in height and 18 mm in diameter, and the design capacity was 1500 mAh.

Examples 2 and 3 and Comparative Examples 1 to 4

In Examples 2 and 3 and Comparative Examples 1 to 4, the abundance ratio of nickel, cobalt, and manganese was not changed, and batteries were prepared in a similar manner to the case of Example 1 except that the compositions of the positive electrode active material a differed among them.

That is, the abundance ratio of nickel, cobalt, and manganese in the positive electrode active material a of the cylindrical nonaqueous electrolyte secondary batteries according to Examples 2 and 3 and Comparative Examples 1 to 4 was 0.3:0.4:0.3 (mole ratio) in a similar manner to Example 1, but the content proportion of tungsten and zirconium differed from Example 1. That is, the content proportions (mol %) of tungsten and zirconium were 0.1 mol % and 5 mol % (Example 2), 5 mol % and 0.1 mol % (Example 3), 0.0 mol % and 5 mol % (Comparative Example 1), 10 mol % and 5 mol % (Comparative Example 2), 5 mol % and 0 mol % (Comparative Example 3), and 5 mol % and 10 mol % (Comparative Example 4).

Note that the total of the contained molar amounts of nickel, cobalt, manganese, tungsten, and zirconium was 1 mol with respect to 1 mol of lithium included in the positive electrode active material a in a similar manner to the case of Example 1. The compositions of the positive electrode active material a in Examples 2 and 3 and Comparative Examples 1 to 4 were as follows.

Example 2: $Li(Ni_{0.3}Co_{0.4}Mn_{0.3})_{0.949}W_{0.001}Zr_{0.05}O_2$
Example 3: $Li(Ni_{0.3}Co_{0.4}Mn_{0.3})_{0.949}W_{0.05}Zr_{0.001}O_2$
Comparative Example 1: $Li(Ni_{0.3}Co_{0.4}Mn_{0.3})_{0.95}Zr_{0.05}O_2$
Comparative Example 2: $Li(Ni_{0.3}Co_{0.4}Mn_{0.3})_{0.85}W_{0.1}Zr_{0.05}O_2$
Comparative Example 3: $Li(Ni_{0.3}Co_{0.4}Mn_{0.3})_{0.95}W_{0.05}O_2$
Comparative Example 4: $Li(Ni_{0.3}Co_{0.4}Mn_{0.3})_{0.85}W_{0.05}Zr_{0.1}O_2$ Examples 4 to 12 and Comparative Examples 5 to 10

In Examples 4 to 12 and Comparative Examples 5 to 10, the content proportion of tungsten and zirconium was not changed, and batteries were prepared in a similar manner to Example 1 except that the compositions of the positive electrode active material a differed among them.

That is, the content proportions of tungsten and zirconium in the positive electrode active material a of the cylindrical nonaqueous electrolyte secondary batteries according to Examples 4 to 12 and Comparative Examples 5 to 10 were each 5 mol % in a similar manner to Example 1, but the abundance ratio of nickel, cobalt, and manganese differed from Example 1. That is, the abundance ratios (mole ratios) of nickel, cobalt, and manganese were 0.6:0.4:0.0 (Example 4), 0.6:0.3:0.1 (Example 5), 0.6:0.1:0.3 (Example 6), 0.5:0.3:0.2 (Example 7), 0.5:0.2:0.3 (Example 8), 0.4:0.3:0.3 (Example 9), 0.4:0.2:0.4 (Example 10), 0.3:0.7:0.0 (Example 11), 0.3:0.5:0.2 (Example 12), 0.8:0.0:0.2 (Comparative Example 5), 0.6:0.0:0.4 (Comparative Example 6), 0.4:0.1:0.5 (Comparative Example 7), 0.3:0.2:0.5 (Comparative Example 8), 0.2:0.8:0.0 (Comparative Example 9), and 0.2:0.7:0.1 (Comparative Example 10).

Examples 13 and 14 and Comparative Examples 11 to 15

In Examples 13 and 14 and Comparative Examples 11 and 15, batteries were prepared in a similar manner to Example 1 except that only the mixture proportion of the positive electrode active material a and the positive electrode active material b was changed.

That is, in a cylindrical nonaqueous electrolyte secondary battery according to Examples 13 and 14 and Comparative Examples 11 and 15, $Li(Ni_{0.3}CO_{0.4}Mn_{0.3})_{0.9}W_{0.05}Zr_{0.05}O_2$ was used as the positive electrode active material a and $LiMn_2O_4$ as the positive electrode active material b in a similar manner to Example 1, but the mixture ratios were changed to 90:10 (Example 13), 60:40 (Example 14), 50:50 (Comparative Example 11), and 100:0 (Comparative Example 15) in mass ratio in contrast to 80:20 for the positive electrode active material a and the positive electrode active material b in Example 1.

In addition, the positive electrode active material a of the cylindrical nonaqueous electrolyte secondary batteries according to Comparative Examples 12 to 14 was prepared in a similar manner to Comparative Example 15, Example 13, and Example 14 except that tungsten and zirconium were not contained.

Examples 15 to 17 and Comparative Examples 16 to 21

Cylindrical nonaqueous electrolyte secondary batteries according to Examples 15 to 17 were prepared in a similar manner to Example 1 except that 5 mol % of a dissimilar element was further contained in tungsten- and zirconium-containing lithium nickel-cobalt-manganese oxide of Example 1 to be used as the positive electrode active material a. That is, the positive electrode active material a of the cylindrical nonaqueous electrolyte secondary batteries according to Examples 15 to 17 contained titanium (Example 15), aluminum (Example 16), or magnesium (Example 17) in a proportion of 5 mol % in a similar manner to tungsten or zirconium.

While the abundance ratio of nickel, cobalt, and manganese was 0.3:0.4:0.3 (mole ratio) in a similar manner to Example 1, the total of the contained molar amounts of titanium, aluminum, or magnesium in addition to the contained molar amounts of nickel, cobalt, manganese, tungsten, and zirconium was 1 mol with respect to 1 mol of lithium contained in the positive electrode active material a.

While the cylindrical nonaqueous electrolyte secondary batteries of Comparative Examples 16 to 21 contained titanium (Comparative Examples 16 to 18) in a similar manner to Example 15 described above or contained aluminum (Comparative Examples 19 to 21) in a similar manner to Example 16 described above for the positive electrode active material a, the cylindrical nonaqueous electrolyte secondary batteries according to Comparative Examples 16 to 21 were prepared in a similar manner to Example 1 except that they did not contain one or both of tungsten and zirconium.

Examples 18 to 20

In Examples 18 to 20, a dissimilar metal was added to the positive electrode active material b in an opposite manner to Examples 15 to 17. That is, batteries were prepared in a similar manner to Example 1 except that manganese was partially replaced for the positive electrode active material b by boron (Example 18), aluminum (Example 19), or magnesium (Example 20) as the dissimilar element with respect to spinel lithium manganese oxide in Example 1. Note that the content proportion of the dissimilar element within the positive electrode active material b according to Examples 18 to 20 was 5 mol %.

Examples 21 to 26 and Comparative Examples 22 to 24

In Examples 21 to 26 and Comparative Examples 22 to 24, batteries were prepared with only the composition of the nonaqueous electrolyte being changed with respect to the nonaqueous electrolyte secondary battery of Example 1. Of those, in Examples 21 and 22 and Comparative Example 22, the content proportion of EC (20% by mass), VC (2% by mass), and $LiPF_6$ (18% by mass) was fixed to the same value as in Example 1, and the proportions of DMC and MEC in chain carbonate were changed.

That is, the total of chain carbonate in the entire amount of nonaqueous electrolyte was 60% by mass in a similar manner to Example 1, and a nonaqueous electrolyte was used in which the proportions of DMC and MEC in chain carbonate were 25% by mass and 75% by mass (Example 21), 100% by mass and 0% by mass (Example 22), 10% by mass and 90% by mass (Comparative Example 22) in contrast to 48:12 (mass ratio) in Example 1, i.e., 80% by mass of DMC and 20% by mass of MEC when expressed in proportions in chain carbonate.

In addition, in Examples 23 to 26 and Comparative Examples 23 and 24, the content proportions of VC and $LiPF_6$ and the proportions of DMC and MEC in chain carbonate were similar to Examples 21 and 22 and Comparative Example 22, and the mixture proportions of EC and chain carbonate differed among them.

That is, in Examples 23 and 24 and Comparative Example 23, the proportion of EC with respect to the entire amount of nonaqueous electrolyte was 40% by mass (resulting in 40% by mass of chain carbonate). In Examples 25 and 26 and Comparative Example 24, the proportion of EC with respect to the entire amount of nonaqueous electrolyte was 10% by mass (resulting in 70% by mass of chain carbonate), and the proportions of DMC and MEC in chain carbonate were 25% by mass and 75% by mass (Examples 23 and 25), 100% by mass and 0% by mass (Examples 24 and 26), and 10% by mass and 90% by mass (Comparative Examples 23 and 24) in a similar manner to Examples 21 and 22 and Comparative Example 23 described above.

In a nonaqueous electrolyte secondary battery of each example and comparative example prepared in the manner described above, a charge-discharge cycling characteristics test was performed. Of those, for Examples 1 and 13 to 20 and Comparative Examples 11 to 21, a short-circuit test was further performed. The conditions for each test are shown below.

[Charge-Discharge Cycling Characteristics Test]

The charge-discharge conditions in the charge-discharge cycling characteristics test were as follows.

Charging: Constant current charging was performed with a current of 1.0 It (1500 mA) until the battery voltage was 4.20 V, and then charging was done with a constant voltage of 4.2 V until the current was 0.2 It (30 mA).

Discharging: Constant current discharging was performed with a high-rate current of 10 It (15 A) until the battery voltage was 2.7 V.

Environment temperature: Charging and discharging were performed at 25° C.

With the charge-discharge conditions described above, a charge-discharge cycle was repeated 200 times. The discharge capacity on the first cycle and the discharge capacity on the 200th cycle were measured, and the capacity retention rate after 200 cycles was calculated from the following calculation formula to obtain the charge-discharge cycling characteristics.

Capacity retention rate (%)=(Discharge capacity on 200th cycle/Discharge capacity on first cycle)×100

[Short-Circuit Test]

Five each of batteries according to Examples 1 and 13 to 20 and Comparative Examples 11 to 21 were prepared. Constant current charging was performed with a current of 1.0 It (1500 mA) until the battery voltage was 4.40 V, and then charging was done with a constant voltage of 4.4 V until the current was 0.2 It (30 mA). Next, a nail made of iron that was 3 mm in diameter penetrated near the center of the battery, and the number of batteries that generated smoke was counted.

The results of each test are shown in Tables 1 to 6 together with the composition of the positive electrode active material or the composition of the nonaqueous electrolyte. Note that Table 1 shows the results of the charge-discharge cycling characteristics test of Examples 2 and 3 and Comparative Examples 1 to 4 together with Example 1, Table 2 shows the results of the charge-discharge cycling characteristics test of Examples 4 to 12 and Comparative Examples 5 to 10 together with Example 1, Table 3 shows the results of the charge-discharge cycling characteristics test and the short-circuit test of Examples 13 and 14 and Comparative Examples 11 to 15 together with Example 1, Table 4 shows the results of the charge-discharge cycling characteristics test and the short-circuit test of Examples 15 to 17 and Comparative Examples 16 to 21 together with Example 1, Table 5 shows the results of the charge-discharge cycling characteristics test and the short-circuit test of Examples 18 to 20 together with Example 1, and Table 6 shows the results of the charge-discharge cycling characteristics test of Examples 21 to 26 and Comparative Examples 22 to 24 together with Example 1.

TABLE 1

| | Positive electrode active material | | | | | | | |
|---|---|---|---|---|---|---|---|---|
| | Positive electrode active material a $Li(Ni_bCo_cMn_d)_{1-x-y}W_xZr_yO_2$ | | | | | | Positive electrode active material b LiMn$_2$O$_4$ | |
| | Composition | | | | | | | |
| | Ni content (b) | Co content (c) | Mn content (d) | W content (x) | Zr content (y) | Mixture proportion (Mass percentage with respect to total amount of positive electrode active material) | Mixture proportion (Mass percentage with respect to total amount of positive electrode active material) | Capacity retention ratio (%) |
| Example 1 | 0.3 | 0.4 | 0.3 | 0.05 | 0.05 | 80 | 20 | 85 |
| Example 2 | 0.3 | 0.4 | 0.3 | 0.001 | 0.05 | 80 | 20 | 85 |
| Example 3 | 0.3 | 0.4 | 0.3 | 0.05 | 0.001 | 80 | 20 | 85 |
| Comparative Example 1 | 0.3 | 0.4 | 0.3 | — | 0.05 | 80 | 20 | 81 |
| Comparative Example 2 | 0.3 | 0.4 | 0.3 | 0.1 | 0.05 | 80 | 20 | 81 |
| Comparative Example 3 | 0.3 | 0.4 | 0.3 | 0.05 | — | 80 | 20 | 81 |
| Comparative Example 4 | 0.3 | 0.4 | 0.3 | 0.05 | 0.1 | 80 | 20 | 81 |

TABLE 2

| | Positive electrode active material | | | | | | | |
|---|---|---|---|---|---|---|---|---|
| | Positive electrode active material a $Li(Ni_bCo_cMn_d)_{1-x-y}W_xZr_yO_2$ | | | | | Mixture proportion (Mass | Positive electrode active material b LiMn$_2$O$_4$ | |
| | Composition | | | | | percentage with respect to | Mixture proportion (Mass percentage with respect to | |
| | Ni content (b) | Co content (c) | Mn content (d) | W content (x) | Zr content (y) | total amount of positive electrode active material) | total amount of positive electrode active material) | Capacity retention ratio (%) |
| Example 1 | 0.3 | 0.4 | 0.3 | 0.05 | 0.05 | 80 | 20 | 85 |
| Example 4 | 0.6 | 0.4 | 0 | 0.05 | 0.05 | 80 | 20 | 85 |
| Example 5 | 0.6 | 0.3 | 0.1 | 0.05 | 0.05 | 80 | 20 | 85 |
| Example 6 | 0.6 | 0.1 | 0.3 | 0.05 | 0.05 | 80 | 20 | 85 |
| Example 7 | 0.5 | 0.3 | 0.2 | 0.05 | 0.05 | 80 | 20 | 84 |
| Example 8 | 0.5 | 0.2 | 0.3 | 0.05 | 0.05 | 80 | 20 | 85 |
| Example 9 | 0.4 | 0.3 | 0.3 | 0.05 | 0.05 | 80 | 20 | 85 |
| Example 10 | 0.4 | 0.2 | 0.4 | 0.05 | 0.05 | 80 | 20 | 85 |
| Example 11 | 0.3 | 0.7 | 0 | 0.05 | 0.05 | 80 | 20 | 84 |
| Example 12 | 0.3 | 0.5 | 0.2 | 0.05 | 0.05 | 80 | 20 | 85 |
| Comparative Example 5 | 0.8 | 0 | 0.2 | 0.05 | 0.05 | 80 | 20 | 79 |
| Comparative Example 6 | 0.6 | 0 | 0.4 | 0.05 | 0.05 | 80 | 20 | 77 |
| Comparative Example 7 | 0.4 | 0.1 | 0.5 | 0.05 | 0.05 | 80 | 20 | 78 |
| Comparative Example 8 | 0.3 | 0.2 | 0.5 | 0.05 | 0.05 | 80 | 20 | 73 |

TABLE 2-continued

| | Positive electrode active material | | | | | | Positive electrode active material b LiMn$_2$O$_4$ | |
|---|---|---|---|---|---|---|---|---|
| | Positive electrode active material a Li(Ni$_b$Co$_c$Mn$_d$)$_{1-x-y}$W$_x$Zr$_y$O$_2$ | | | | | | | |
| | Composition | | | | | Mixture proportion (Mass | Mixture proportion (Mass | |
| | Ni content (b) | Co content (c) | Mn content (d) | W content (x) | Zr content (y) | percentage with respect to total amount of positive electrode active material) | percentage with respect to total amount of positive electrode active material) | Capacity retention ratio (%) |
| Comparative Example 9 | 0.2 | 0.8 | 0 | 0.05 | 0.05 | 80 | 20 | 80 |
| Comparative Example 10 | 0.2 | 0.7 | 0.1 | 0.05 | 0.05 | 80 | 20 | 80 |

TABLE 3

| | Positive electrode active material | | | | | | Positive electrode active material b LiMn$_2$O$_4$ | | Short-circuit test (Number |
|---|---|---|---|---|---|---|---|---|---|
| | Positive electrode active material a Li(Ni$_b$Co$_c$Mn$_d$)$_{1-x-y}$W$_x$Zr$_y$O$_2$ | | | | | | | | of batteries |
| | Composition | | | | | Mixture proportion (Mass | Mixture proportion (Mass | | |
| | Ni content (b) | Co content (c) | Mn content (d) | W content (x) | Zr content (y) | percentage with respect to total amount of positive electrode active material) | percentage with respect to total amount of positive electrode active material) | Capacity retention ratio (%) | that generated smoke) |
| Example 1 | 0.3 | 0.4 | 0.3 | 0.05 | 0.05 | 80 | 20 | 85 | 0 |
| Example 13 | 0.3 | 0.4 | 0.3 | 0.05 | 0.05 | 90 | 10 | 85 | 3 |
| Example 14 | 0.3 | 0.4 | 0.3 | 0.05 | 0.05 | 60 | 40 | 84 | 0 |
| Comparative Example 11 | 0.3 | 0.4 | 0.3 | 0.05 | 0.05 | 50 | 50 | 80 | 0 |
| Comparative Example 12 | 0.3 | 0.4 | 0.3 | — | — | 100 | — | 83 | 5 |
| Comparative Example 13 | 0.3 | 0.4 | 0.3 | — | — | 90 | 10 | 80 | 5 |
| Comparative Example 14 | 0.3 | 0.4 | 0.3 | — | — | 60 | 40 | 78 | 2 |
| Comparative Example 15 | 0.3 | 0.4 | 0.3 | 0.05 | 0.05 | 100 | — | 85 | 5 |

TABLE 4

| | Positive electrode active material | | | | | | | | | | Short-circuit test (Number |
|---|---|---|---|---|---|---|---|---|---|---|---|
| | Positive electrode active material a Li(Ni$_b$Co$_c$Mn$_d$)$_{1-x-y}$W$_x$Zr$_y$M2$_z$O$_2$ | | | | | | | Positive electrode active material b LiMn$_2$O$_4$ | | | |
| | | | | | | | | Mixture proportion (Mass percentage with respect to total | Mixture proportion (Mass percentage with respect to total | | |
| | Composition | | | | | | | | | | |
| | Ni content (b) | Co content (c) | Mn content (d) | W content (x) | Zr content (y) | M2 Element | M2 Content (z) | amount of positive electrode active material) | amount of positive electrode active material) | Capacity retention ratio (%) | of batteries that generated smoke) |
| Example 1 | 0.3 | 0.4 | 0.3 | 0.05 | 0.05 | — | — | 80 | 20 | 85 | 0 |
| Example 15 | 0.3 | 0.4 | 0.3 | 0.05 | 0.05 | Ti | 0.05 | 80 | 20 | 84 | 0 |
| Example 16 | 0.3 | 0.4 | 0.3 | 0.05 | 0.05 | Al | 0.05 | 80 | 20 | 85 | 0 |
| Example 17 | 0.3 | 0.4 | 0.3 | 0.05 | 0.05 | Mg | 0.05 | 80 | 20 | 84 | 0 |
| Comparative Example 16 | 0.3 | 0.4 | 0.3 | — | — | Ti | 0.05 | 80 | 20 | 80 | 4 |
| Comparative Example 17 | 0.3 | 0.4 | 0.3 | — | 0.05 | Ti | 0.05 | 80 | 20 | 81 | 4 |
| Comparative Example 18 | 0.3 | 0.4 | 0.3 | 0.05 | — | Ti | 0.05 | 80 | 20 | 81 | 3 |
| Comparative Example 19 | 0.3 | 0.4 | 0.3 | — | — | Al | 0.05 | 80 | 20 | 80 | 4 |

TABLE 4-continued

| | Positive electrode active material | | | | | | | | | |
|---|---|---|---|---|---|---|---|---|---|---|
| | Positive electrode active material a $Li(Ni_bCo_cMn_d)_{1-x-y}W_xZr_yM2_zO_2$ | | | | | | | Positive electrode active material b $LiMn_2O_4$ | | |
| | Composition | | | | | | Mixture proportion (Mass percentage with respect to total amount of positive electrode active material) | Mixture proportion (Mass percentage with respect to total amount of positive electrode active material) | Capacity retention ratio (%) | Short-circuit test (Number of batteries that generated smoke) |
| | Ni content (b) | Co content (c) | Mn content (d) | W content (x) | Zr content (y) | M2 Element | Content (z) | | | | |
| Comparative Example 20 | 0.3 | 0.4 | 0.3 | — | 0.05 | Al | 0.05 | 80 | 20 | 81 | 4 |
| Comparative Example 21 | 0.3 | 0.4 | 0.3 | 0.05 | — | Al | 0.05 | 80 | 20 | 80 | 3 |

TABLE 5

| | Positive electrode active material | | | | | | | | | |
|---|---|---|---|---|---|---|---|---|---|---|
| | Positive electrode active material a $Li(Ni_bCo_cMn_d)_{1-x-y}W_xZr_yO_2$ | | | | | | Positive electrode active material b $LiMn_{2-f}M1_fO_4$ | | | |
| | Composition | | | | | Mixture proportion (Mass percentage with respect to total amount of positive electrode active material) | | | | Short-circuit test (Number of batteries that generated smoke) |
| | Ni content (b) | Co content (c) | Mn content (d) | W content (x) | Zr content (y) | | M1 Element Type | Content (f) | Mixture proportion (Mass percentage with respect to total amount of positive electrode active material) | Capacity retention ratio (%) | |
| Example 1 | 0.3 | 0.4 | 0.3 | 0.05 | 0.05 | 80 | — | 0 | 20 | 85 | 0 |
| Example 18 | 0.3 | 0.4 | 0.3 | 0.05 | 0.05 | 80 | B | 0.05 | 20 | 85 | 0 |
| Example 19 | 0.3 | 0.4 | 0.3 | 0.05 | 0.05 | 80 | Al | 0.05 | 20 | 85 | 0 |
| Example 20 | 0.3 | 0.4 | 0.3 | 0.05 | 0.05 | 80 | Mg | 0.05 | 20 | 84 | 0 |

TABLE 6

| | EC concentration (mass percent) | Total concentration of DMC and MEC (mass percent) | Proportions in the total of DMC and MEC (mass percent) | | Capacity retention ratio (%) |
|---|---|---|---|---|---|
| | | | DMC | MEC | |
| Example 1 | 20 | 60 | 80 | 20 | 85 |
| Example 21 | 20 | 60 | 25 | 75 | 85 |
| Example 22 | 20 | 60 | 100 | 0 | 85 |
| Example 23 | 40 | 40 | 25 | 75 | 85 |
| Example 24 | 40 | 40 | 100 | 0 | 85 |
| Example 25 | 10 | 70 | 25 | 75 | 85 |
| Example 26 | 10 | 70 | 100 | 0 | 85 |
| Comparative Example 22 | 20 | 60 | 10 | 90 | 80 |
| Comparative Example 23 | 40 | 40 | 10 | 90 | 79 |
| Comparative Example 24 | 10 | 70 | 10 | 90 | 79 |

Positive electrode active material a: Positive electrode active material b = 8:2
Positive electrode active material a = $Li(Ni_{0.3}Co_{0.4}Mn_{0.3})_{0.9}W_{0.05}Zr_{0.05}O_2$
Positive electrode active material b = $LiMn_2O_4$ The results of the charge-discharge cycling characteristics test and the short-circuit test shown in Tables 1 to 6 indicate the following.

First, from the results of Comparative Examples 12 to 14, deterioration in the cycling characteristics was observed along with an increase in the mixture ratio of spinel lithium manganese oxide as the positive electrode active material b, and a considerable decrease in the cycling characteristics was found when the mixture ratio of the positive electrode active material b was increased to an extent that the improvement effect in safety can be confirmed (Comparative Example 14). Thus, in a nonaqueous electrolyte secondary battery using, as the positive electrode active material, a material in which lithium nickel-cobalt-manganese oxide, not containing tungsten or zirconium, and spinel lithium manganese oxide are mixed, it is apparently difficult to realize both the cycling characteristics and safety.

In contrast, the comparison of Example 13 and Comparative Example 13 and comparison of Example 14 and Comparative 14 indicate that the cycling characteristics and safety are improved by including tungsten and zirconium in lithium nickel-cobalt-manganese oxide as the positive electrode active material a and that a nonaqueous electrolyte secondary battery in which the cycling characteristics and safety are improved can be obtained by using, as the positive electrode active material, a material in which tungsten- and zirconium-containing lithium nickel-cobalt-manganese oxide and spinel lithium manganese oxide are mixed.

In Comparative Example 11, the cycling characteristics are comparable to Comparative Examples 13 and 14 and have not been improved, regardless of tungsten and zirconium being contained in lithium nickel-cobalt-manganese oxide as the positive electrode active material a. Thus, it can be seen that the effect of realizing both an improvement in the cycling characteristics and an improvement in safety is exhibited at least in the case where the mixture proportion of tungsten- and zirconium-containing lithium nickel-cobalt-manganese oxide as the positive electrode active material a and spinel lithium manganese oxide as the positive electrode active material b is 60:40 to 90:10 for the positive electrode active material a and the positive electrode active material b (mass ratio) and is significantly exhibited particularly in the case of 60:40 to 80:20.

The results of Examples 1 to 3 and Comparative Examples 1 to 4 shown in Table 1 indicate that the content of tungsten and zirconium included in tungsten- and zirconium-containing lithium nickel-cobalt-manganese oxide is preferably 0.1 mol % or greater and 5 mol % or less for tungsten and 0.1 mol % or greater and 5 mol % or less for zirconium.

The results of Examples 1 and 4 to 12 and Comparative Examples 5 to 10 shown in Table 2 indicate that, in the case where the content ratio of Ni, Co, and Mn included in tungsten- and zirconium-containing lithium nickel-cobalt-manganese oxide is given as b:c:d (where b+c+d=1) in that order, use of tungsten- and zirconium-containing lithium nickel-cobalt-manganese oxide that satisfies $0.6 \geq b \geq 0.3$, $0.7 \geq c \geq 0.1$, and $d \leq 0.4$ is preferable. Note that lithium in the positive electrode active material a is preferably 0.9 to 1.2 in mole ratio with respect to tungsten- and zirconium-containing lithium nickel-cobalt-manganese oxide. It is preferable that the content proportion of Li be within this range, since the battery capacity is large and gas generation can be suppressed.

The results of Examples 1 and 15 to 17 shown in Table 4 indicate that the effect described above is exhibited even if titanium, aluminum, or magnesium is further contained as the dissimilar element in tungsten- and zirconium-containing lithium nickel-cobalt-manganese oxide as the positive electrode active material a. However, the results of Comparative Examples 16 to 21 indicate that the effect described above is not exhibited in the case where tungsten and zirconium are both not included in lithium nickel-cobalt-manganese oxide, i.e., in the case where only one of tungsten and zirconium and the dissimilar element are contained and in the case where only the dissimilar element other than tungsten and zirconium is contained.

The results of Examples 1 and 18 to 20 shown in Table 5 indicate that the effect described above is exhibited even if boron, aluminum, or magnesium is contained as the dissimilar element in spinel lithium manganese oxide as the positive electrode active material b. Note that lithium in the positive electrode active material b is preferably 0.9 to 1.2 in mole ratio with respect to spinel lithium manganese oxide. It is preferable that the content proportion of Li be within this range, since the battery capacity and the cycling characteristics can be balanced.

The results of Examples 1 and 21 to 26 and Comparative Examples 22 to 24 shown in Table 6 indicate that the proportion of dimethyl carbonate in the total of dimethyl carbonate and methyl ethyl carbonate is preferably 25% by mass or greater, in the case where the concentration of ethylene carbonate in the nonaqueous electrolyte is 10% by mass or greater and 40% by mass or less.

Note that, although graphite was used as the negative electrode active material in the example described above, carbonaceous substance such as natural graphite, synthetic graphite, or coke, alloy or oxide including silicon, tin, or the like, a mixture of these, or the like that is capable of reversibly absorbing and desorbing lithium ions can be used.

As the solute of the nonaqueous electrolyte used in the nonaqueous electrolyte secondary battery of the present invention, lithium salt generally used as a solute in nonaqueous electrolyte secondary batteries can be used. Examples of such lithium salt include $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, and a mixture of those, other than $LiPF_6$ used in the examples. The amount of dissolution of the solute with respect to the nonaqueous solvent described above is preferably 0.5 to 2.0 mol/L.

The invention claimed is:

1. A nonaqueous electrolyte secondary battery comprising:
a positive electrode plate including a positive electrode active material capable of absorbing and desorbing a lithium ion;
a negative electrode plate including a negative electrode active material capable of absorbing and desorbing a lithium ion; and
a nonaqueous electrolyte including a nonaqueous solvent and a solute,
the positive electrode active material containing
lithium nickel-cobalt-manganese oxide represented by $Li_a(Ni_bCo_cMn_d)_{(1-x-y)}W_xZr_yO_2$ (where $0.9 \leq a \leq 1.2$, $0.3 \leq b \leq 0.6$, $0.1 \leq c \leq 0.7$, $0 \leq d \leq 0.4$, $b+c+d=1$, $0.001 \leq x \leq 0.05$, and $0.001 \leq y \leq 0.05$) and
spinel lithium manganese oxide represented by $Li_eMn_{2-f}M1_fO_4$ (where M1 is at least one element selected from B, Mg, Ca, Sr, Ba, Ti, Ni, Al, Nb, Mo, W, Y, and Rh, $0.9 \leq e \leq 1.2$, and $0 \leq f \leq 0.1$)
in a proportion of 60:40 to 90:10 (mass ratio),
the nonaqueous electrolyte including cyclic carbonate and chain carbonate as the nonaqueous solvent,
a content proportion of the cyclic carbonate being 10% by mass or greater and 40% by mass or less of the nonaqueous electrolyte, and
a content proportion of dimethyl carbonate included in the chain carbonate being 25% by mass or greater and 100% by mass or less.

2. The nonaqueous electrolyte secondary battery according to claim 1, wherein the lithium nickel-cobalt-manganese oxide is represented by $Li_a(Ni_bCo_cMn_d)_{(1-x-y-z)}W_xZr_yM2_zO_2$ (where M2 is at least one element selected from Ti, Nb, Mo, Zn, Al, Sn, Mg, Ca, and Sr, $0.9 \leq a \leq 1.2$, $0.3 \leq b \leq 0.6$, $0.1 \leq c \leq 0.7$, $0 \leq d \leq 0.4$, $b+c+d=1$, $0.001 \leq x \leq 0.05$, $0.001 \leq y \leq 0.05$, and $0.001 \leq z \leq 0.05$).

3. The nonaqueous electrolyte secondary battery according to claim 1, wherein the positive electrode active material includes the lithium nickel-cobalt-manganese oxide and the spinel lithium manganese oxide in a proportion of 60:40 to 80:20 (mass ratio).

4. The nonaqueous electrolyte secondary battery according to claim 2, wherein the positive electrode active material includes lithium nickel-cobalt-manganese oxide and spinel lithium manganese oxide in a proportion of 60:40 to 80:20 (mass ratio).

* * * * *